United States Patent
Wagner et al.

(10) Patent No.: US 10,483,520 B2
(45) Date of Patent: Nov. 19, 2019

(54) BATTERY CELL COMPRISING A FIRST TERMINAL ARRANGED INSIDE A SECOND TERMINAL

(71) Applicant: Robert Bosch GmbH, Stuttgart (DE)

(72) Inventors: Christian Wagner, Kaiserslautern (DE); Daniel Bernd Greiner, Tuebingen (DE); Matthias Riedmann, Winnenden (DE); Peter Kohn, Stuttgart (DE); Robert Hafenbrak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/735,261

(22) PCT Filed: Jun. 3, 2016

(86) PCT No.: PCT/EP2016/062646
§ 371 (c)(1),
(2) Date: Dec. 11, 2017

(87) PCT Pub. No.: WO2016/198332
PCT Pub. Date: Dec. 15, 2016

(65) Prior Publication Data
US 2018/0175361 A1 Jun. 21, 2018

(30) Foreign Application Priority Data
Jun. 11, 2015 (DE) ........................ 10 2015 210 671

(51) Int. Cl.
*H01M 2/30* (2006.01)
*H01M 2/10* (2006.01)
(Continued)

(52) U.S. Cl.
CPC ......... *H01M 2/305* (2013.01); *H01M 2/1077* (2013.01); *H01M 2/1083* (2013.01);
(Continued)

(58) Field of Classification Search
None
See application file for complete search history.

(56) References Cited

U.S. PATENT DOCUMENTS

| 2001/0014418 A1 | 8/2001 | Nemoto | |
| 2002/0006544 A1* | 1/2002 | Asaka | H01G 9/26 |
| | | | 429/99 |

(Continued)

FOREIGN PATENT DOCUMENTS

| DE | 2901427 | 7/1979 |
| DE | 10122682 | 11/2001 |

(Continued)

OTHER PUBLICATIONS

International Search Report for Application No. PCT/EP2016/062646 dated Sep. 2, 2016 (English Translation, 3 pages).

*Primary Examiner* — Eli S Mekhlin
(74) *Attorney, Agent, or Firm* — Michael Best & Friedrich LLP

(57) ABSTRACT

The invention relates to a battery cell (10) comprising a first terminal (1), which is electrically conductively connected to a first electrode, and a second terminal (2), which is electrically conductively connected to a second electrode, the first terminal (1) being arranged inside the second terminal (2). The invention further relates to a battery module (200) comprising corresponding battery cells (10), to a battery, to a method for producing the battery module (200), and to a use for the battery.

20 Claims, 3 Drawing Sheets

(51) Int. Cl.
*H01M 2/12* (2006.01)
*H01M 2/20* (2006.01)
*H01M 10/04* (2006.01)

(52) U.S. Cl.
CPC ............ *H01M 2/12* (2013.01); *H01M 2/206* (2013.01); *H01M 10/0422* (2013.01); *H01M 2220/20* (2013.01)

(56) References Cited

U.S. PATENT DOCUMENTS

| | | | |
|---|---|---|---|
| 2002/0022178 A1* | 2/2002 | Asaka | B60K 6/28 |
| | | | 429/158 |
| 2011/0183166 A1* | 7/2011 | Suga | H01M 2/30 |
| | | | 429/61 |
| 2013/0083453 A1* | 4/2013 | Kobayashi | H01G 2/04 |
| | | | 361/502 |
| 2014/0050967 A1* | 2/2014 | Fuhr | H01M 2/305 |
| | | | 429/158 |
| 2015/0214522 A1 | 7/2015 | Muck et al. | |

FOREIGN PATENT DOCUMENTS

| | | |
|---|---|---|
| DE | 102012215205 | 3/2014 |
| DE | 102012218162 | 6/2014 |
| EP | 1111698 | 6/2001 |
| EP | 1791198 | 5/2007 |
| EP | 2675000 | 12/2013 |
| GB | 2248338 | 4/1992 |
| JP | 2012022955 A | 2/2012 |
| WO | 9423460 | 10/1994 |

* cited by examiner

BATTERY CELL COMPRISING A FIRST TERMINAL ARRANGED INSIDE A SECOND TERMINAL

BACKGROUND OF THE INVENTION

The present invention relates to a battery cell, in particular to a lithium-ion battery cell, having a first terminal which is arranged within a second terminal, and also to a battery module, a battery, a method for producing the battery module and to the use of the battery.

A battery cell is an electrochemical energy store which, when it is discharged, converts the stored chemical energy into electrical energy by virtue of an electrochemical reaction. It is evident that, in the future, new battery systems which are subject to very high demands in respect of reliability, safety, performance and service life will be used both in stationary applications, such as wind power plants, in motor vehicles which are designed as hybrid or electric motor vehicles, and also in electronics devices. Owing to their high energy density, lithium-ion batteries in particular are used as energy stores for electrically driven motor vehicles.

DE 102012215205 A1 discloses a cell connector which has a covering device with an internal thread. The internal thread of the cell connector can be connected to an external thread of a battery cell.

DE 2901427 A1 discloses a rechargeable battery having an internal thread into which a pipe with an external thread can be screwed. The housing has a further internal thread which is arranged coaxially in relation to the first internal thread and interacts with an external thread of a tool in order to screw the rotatable pipe into the battery or out of said battery.

DE 102012218162 A1 discloses an apparatus for connecting a plurality of energy storage modules to one another. In this case, screws which have an external thread are in each case provided for connecting the modules. Furthermore, the screws have an internal thread in the screw cap, which internal thread is arranged concentrically in relation to the external thread.

EP 2675000 A1 discloses a battery cell having two terminals which protrude parallel in relation to one another from the same surface of the housing of the battery cell. In this case, the two terminals are of pin-like design and comprise an external thread onto each of which a nut is screwed.

SUMMARY OF THE INVENTION

The invention provides a battery cell having a first terminal and a second terminal, wherein the first terminal is arranged within the second terminal, and also a battery module, a battery and a method for producing the battery module.

The battery cell according to the invention having a first terminal which is electrically conductively connected to a first electrode and a second terminal which is electrically conductively connected to a second electrode, wherein the first terminal is arranged within the second terminal, provides the advantage that the terminals take up only a small amount of space in the area surrounding the battery cell. The space which is taken up by the first terminal and by the second terminal of the battery cell is considerably smaller than conventional battery cells with two terminals which are not arranged one within the other. In comparison to terminals of a battery cell which are arranged, for example, on two opposite side faces of the battery cell, as is customary in the case of round cells for example, one of these side faces of the battery cell is now unavailable for other functions, such as cooling of the battery cell for example. Furthermore, space is saved when battery cells according to the invention are assembled since the terminals project only from one side face of the battery cells and, for example, no terminal projects from the opposite side face. Furthermore, working steps are saved when a plurality of battery cells according to the invention are assembled since the battery cell does not have to be turned when it is being fitted, but rather only has to make contact with a side face.

In a particularly advantageous embodiment, the first and the second terminal each have a screw thread. A screw thread has the advantage that a screw connection can be released again. In the case of a defect in a battery cell, said battery cell can therefore be replaced without the entire battery module having to be disposed of. Furthermore, it is advantageous in the case of a screw connection that said screw connection can be released and reconnected again several times, this not being possible in the case of weld connections for example. In addition, the quality of the connection is not reduced by releasing and reconnecting a screw connection again several times. In addition, it is advantageous that screw threads are temperature resistant and no changes in the microstructure occur during the connection process of screwing. Furthermore, it is easy to produce screw connections from different materials. In addition, it is advantageous in the case of a screw connection that no problematical particles which can later cause a short-circuit for example are produced in comparison to a weld connection for example.

In one advantageous embodiment, the screw thread of the first terminal is an internal thread and the screw thread of the second terminal is an external thread. In this way, the space between the first terminal and the second terminal is not limited by a thread, so that, for example, an insulator can be easily inserted into said space, without said insulator being able to be damaged by the thread. In an alternative embodiment, the screw thread of the first terminal is an external thread and the screw thread of the second terminal is an internal thread. The advantage here is that the space within the first terminal is not limited by a thread, so that a degassing valve can be introduced into the space within the first terminal there for example, without there being a risk of damage to the degassing valve.

In a further advantageous embodiment, the rotation direction and the pitch of the screw thread of the first terminal and of the screw thread of the second terminal correspond. As a result, it is possible to make contact with the first terminal and the second terminal simultaneously, for example by both terminals being screwed into a module cover simultaneously, so that the current can be tapped off. The electrical connection of the terminals of the battery cells can therefore be realized in a simple manner. In addition, time and working steps are saved by virtue of screwing in the first and the second terminal simultaneously.

In one advantageous embodiment, the thread starting point of the screw thread of the first terminal and of the screw thread of the second terminal correspond. Here, the intended meaning of the expression thread start point is that the ends of the screw threads of the first and second terminals, which ends are situated outside the battery cell, start at the same height and are not offset in relation to one another. This ensures that the screw connection of the two terminals, for example to a module cover, takes place simultaneously, so that a good and secure connection results.

Furthermore, for the same reasons, it is advantageous when the thread length of the screw thread of the first terminal and of the screw thread of the second terminal correspond. If a module cover is screw-connected to the first and the second terminal, both screw threads therefore have the same thread stop.

In a particularly preferred embodiment, the first terminal of the battery cell comprises copper and the second terminal comprises aluminum. Since the first terminal is arranged within the second terminal, less copper is required than aluminum, this resulting in advantages in respect of costs since the material copper is more expensive than the material aluminum. In this case, the second terminal forms, for example, the positive terminal. It is advantageous here that the housing of the battery cell can be electrically conductively connected, for example in a simple manner, to the external second terminal, so that, for example, a positive potential is applied to the housing, this providing said housing with resistance against corrosion. As an alternative, the internal first terminal can also be electrically conductively connected to the housing of the battery cell, so that, for example, a negative potential is applied to the housing of the battery cells. In an alternative embodiment, both the first terminal and the second terminal are electrically insulated from the housing of the battery cell by means of an insulating material, so that the housing of the battery cells is free of potential.

In an alternative embodiment, the first terminal comprises aluminum and the second terminal comprises copper.

Aluminum has the advantage that it is lightweight and cost-effective and additionally available in large quantities. However, copper is advantageous in respect of its corrosion resistance, this resulting in a long service life, amongst other things.

In addition, copper can be readily processed and can also be deformed in an optimum manner at low temperatures.

In a further particularly preferred embodiment, both terminals comprise aluminum, this resulting in the abovementioned advantages. Here, for example, at least one terminal which is composed of aluminum can have a metal coating.

In a preferred embodiment, the first terminal and the second terminal are electrically insulated from one another, at least in the region between the screw threads of said terminals, by means of an air gap and/or by means of an insulator. As a result, the safety of the battery cell is considerably increased since the risk of a short circuit of the battery cell is suppressed by the air gap, and in a preferred embodiment by the insulator.

The insulator advantageously comprises a plastic, in particular a polyolefin, in particular a polyethylene or a polypropylene. Any mechanical loads which may occur through the screw threads of the first and of the second terminal can be reliably absorbed by a plastic. Polyolefins are simultaneously robust and flexible and have a high mechanical and chemical stability. From amongst said polyolefins, polyethylene for example has a high toughness, a low water absorption and steam permeability, and also a high resistance to chemicals and additionally can be readily processed and is cost-effective. Polypropylene has a low water absorption, is chemically resistant, electrically insulating and also can be readily processed and is cost-effective.

In a particularly preferred embodiment, a degassing valve is arranged within the first terminal and/or the second terminal. As a result, more space can be saved on the outer faces of the battery cell, this space then being available for other components, for example for a cooling device. The degassing valve can also be arranged between the first terminal and the second terminal.

Furthermore, a battery module having at least two battery cells according to the invention and a battery module cover which comprises, for each battery cell, at least two module cover screw threads for screwing in the battery cell is provided. It is particularly advantageous when the battery module cover comprises conductor tracks which are sheathed using a plastic. The conductor tracks are insulated from one another by the plastic, so that a reliable and safe electrical connection between the battery cells by means of the module cover is ensured. The advantage of the use of plastic for insulating the conductor tracks from one another is that plastic has a low weight, for example compared to metals. Furthermore, it is advantageous that components which are composed of plastic can be produced in a very simple and cost-effective manner and can be easily recycled. Furthermore, by way of example, a degassing channel and/or an electronics system for cell monitoring are/is integrated into the module cover.

In a particularly preferred embodiment, the battery cells are designed as round battery cells. It is advantageous here that the round battery cells can be arranged closely next to one another when they are fitted in the battery module, and nevertheless individual battery cells can be individually released by means of the screw connection and reconnected again, for example in the case of a defect in a battery cell. In this case, it is not necessary for the entire module to be replaced, but rather only the defective battery cell, this saving considerable material and working costs. Furthermore, the battery cells are fixed to one another for example, in particular, transverse to a longitudinal axis of the battery cells, so that a stable arrangement of the battery cells in the battery module is ensured. The fixing is performed, for example, by means of a plate which has recesses of cell size through which the battery cells are inserted transverse to the longitudinal axis and in this way are fixed to one another. Therefore, during the working step of screwing in, electrical contact-connection and also mechanical fixing are established, for example, simultaneously.

A method for producing a battery module, wherein the first terminal and the second terminal of each battery cell are screwed into in each case one module cover screw thread of the battery module cover in synchronism with one another is advantageous. By virtue of screwing the battery cells into the battery module cover, electrical contact is made with the first terminal and the second terminal of the battery cell simultaneously, so that time and working costs are saved. In addition, fitting of the battery cells is very simple.

The battery according to the invention is advantageously used in an electric vehicle, in a hybrid vehicle or in a plug-in hybrid vehicle.

BRIEF DESCRIPTION OF THE DRAWING

Embodiments of the present invention are illustrated in the drawing and explained in greater detail in the description of the figures below. In the drawing.

DETAILED DESCRIPTION

Figure 1:
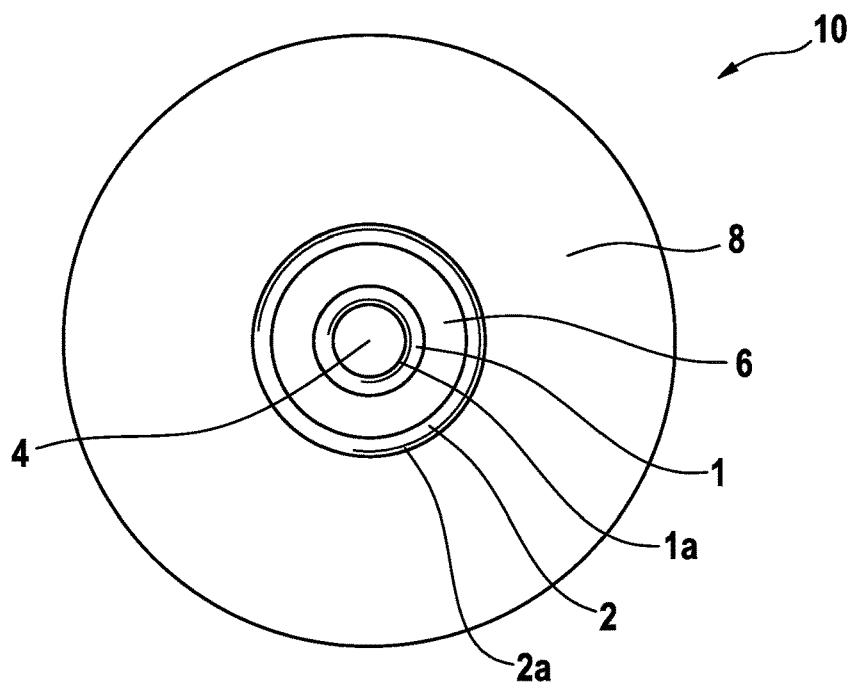
FIG. 1: is a schematic illustration of a plan view of a battery cell according to the invention having a first terminal which is arranged within a second terminal.

FIG. 1 shows a plan view of a battery cell 10 according to the invention having a housing 8. A first terminal 1 and a second terminal 2 protrude out of the housing 8, wherein the first terminal 1 is arranged within the second terminal 2. The first terminal 1 comprises, for example, aluminum and the second terminal 2 comprises, for example, copper. As an alternative, the first terminal 1 comprises copper and the second terminal 2 comprises aluminum. The first terminal 1 is electrically insulated from the second terminal 2 by an insulator 6. The insulator 6 comprises, for example, a plastic, in particular a polyolefin, in particular a polyethylene or a polypropylene. As an alternative, there may be an air gap instead of the insulator 6. A degassing valve 4 is arranged within the first terminal 1.

Figure 2:
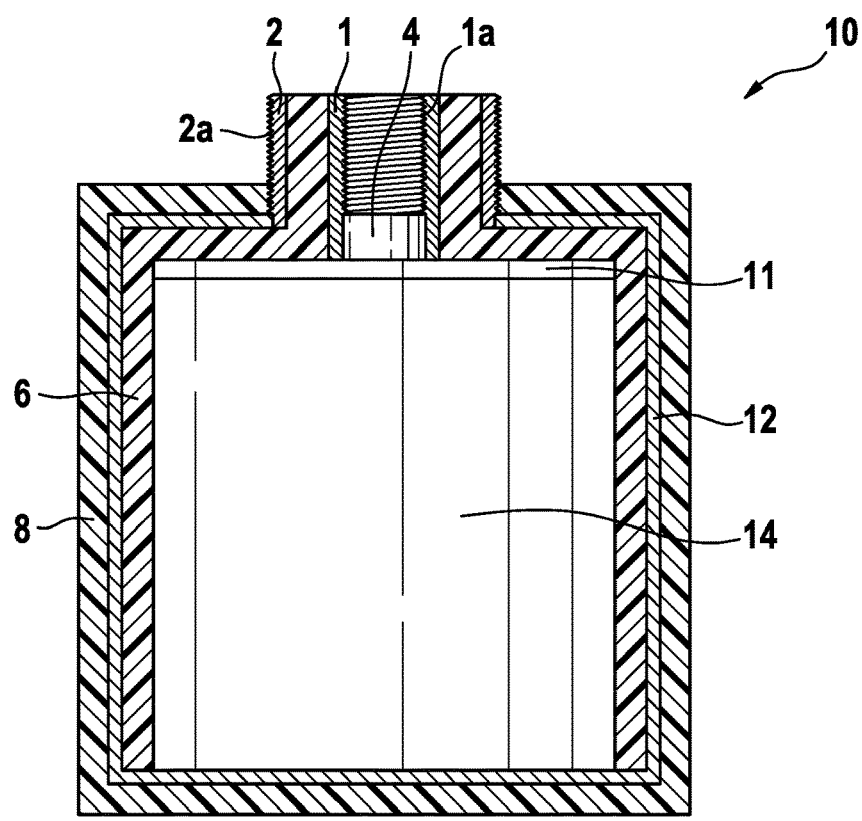
FIG. 2: is a schematic illustration of a longitudinal section through the longitudinal axis of the battery cell according to the invention in accordance with FIG. 1, FIG. 3: is a schematic illustration of a detail of a battery module cover and three battery cells according to the invention in accordance with FIGS. 1 and 2, and FIG. 4: is a schematic illustration of a detail of a battery module according to the invention.

FIG. 2 is a sectional illustration of the battery cell 10 in accordance with FIG. 1. The battery cell 10 comprises an electrode assembly 14 with at least one first electrode, not illustrated, and one second electrode, not illustrated. Furthermore, the electrode assembly 14 comprises, for example, a separator, not illustrated. The first electrode of the electrode assembly 14 is connected to a first current collector 11. The first current collector 11 is electrically conductively connected to the first terminal 1. The first terminal 1 comprises a first screw thread 1a which is designed as an internal thread. As an alternative, the first screw thread 1a of the first terminal 1 can also be an external thread. The second electrode of the electrode assembly 14 is connected to a second current collector 12. The second current collector 12 is electrically conductively connected to the second terminal 2. The second terminal 2 comprises a second screw thread 2a which is designed as an external thread here. As an alternative, the second screw thread 2a of the second terminal 2 can also be an internal thread. The rotation direction of the first screw thread 1a of the first terminal 1 and the rotation direction of the second screw thread 2a of the second terminal 2 correspond for example, and the thread start point of the first screw thread 1a and of the second screw thread 2a also correspond for example. Furthermore, the thread length of the first screw thread 1a of the first terminal 1 corresponds with the thread length of the second screw thread 2a of the second terminal 2 for example. An insulator 6, for example, is arranged between the first terminal 1 and the second terminal 2. Said insulator can be located only between the first terminal 1 and the second terminal 2 or alternatively can also insulate a further region which is located, for example, between the electrode assembly 14 and one of the current collectors 11, 12 and/or which is located between the first current collector 11 and the second current collector 12. The first current collector 11 and the second current collector 12 are illustrated in one piece in FIG. 2. As an alternative, said current collectors can also be designed in several parts.

Figure 3:
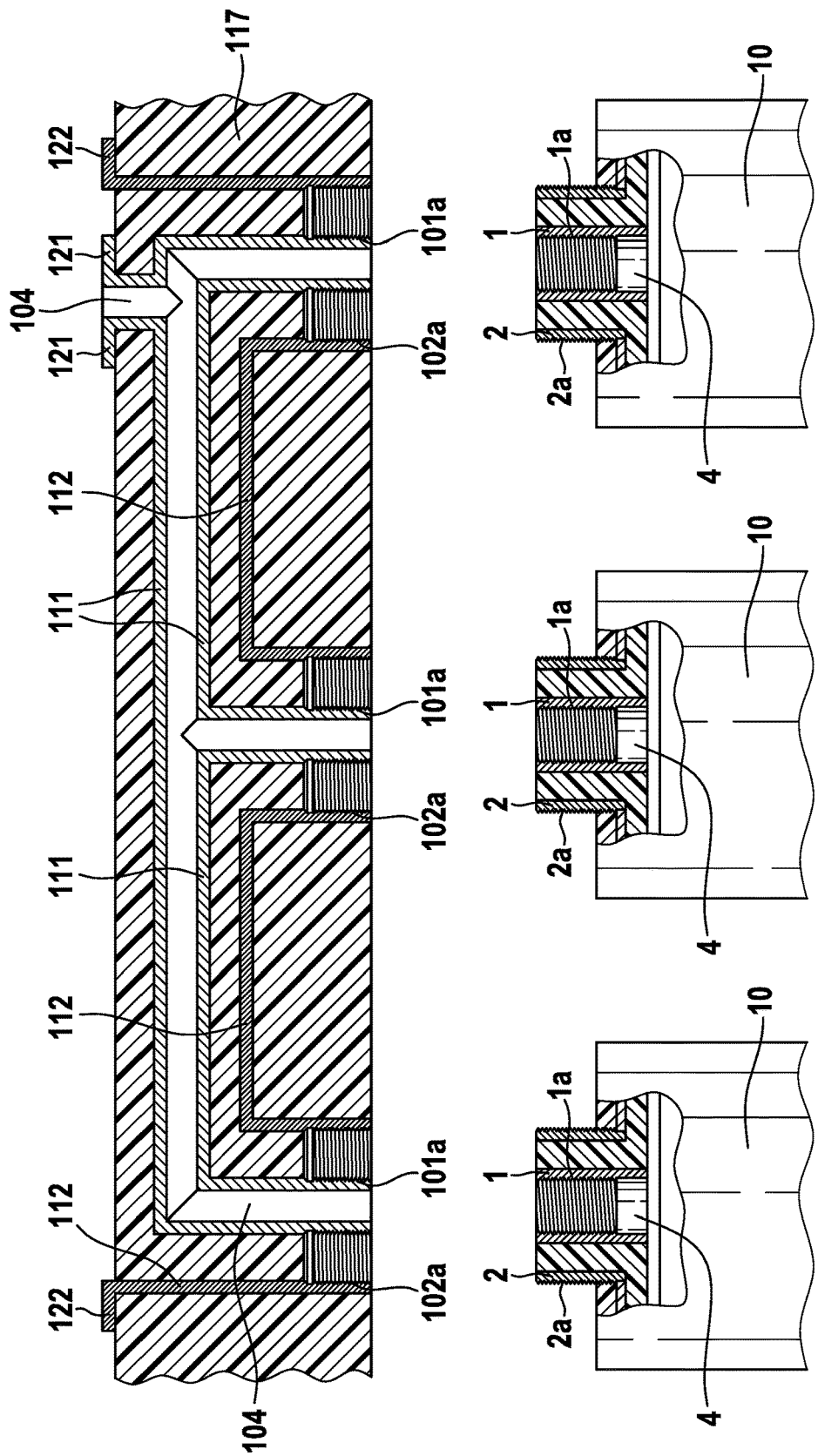

FIG. 3 illustrates three battery cells 10 in accordance with FIGS. 1 and 2 and also a detail from a battery module cover 117. The battery module cover 117 comprises, for example, a plastic, a metal, a metal alloy or a composite comprising plastic and metal or a metal alloy. The battery module cover 117 comprises a first module cover screw thread 101a into which the first screw thread 1a of the first terminal 1 can be screwed. The battery module cover 117 comprises a second module cover screw thread 102a into which the second screw thread 2a of the second terminal 2 can be screwed.

Furthermore, the battery module cover 117 comprises first conductor tracks 111 for tapping off a current of the first terminal 1 of the battery cells 10 and also second conductor tracks 112 for tapping off a current of the second terminal 2 of the battery cells 10. The first conductor tracks 111 and the second conductor tracks 112 are sheathed, for example, using a plastic. The first conductor tracks 111 open into a first module contact region 121 and the second conductor tracks 112 open into second module contact regions 122. Electrical contact can be made with the battery module cover 117 in the module contact regions 121, 122. In FIG. 3, the module contact regions 121, 122 project out of the battery module cover 117. As an alternative, the module contact regions 121, 122 can terminate level with the battery module cover 117 in a planar manner with said battery module cover. In FIG. 3, the first module contact region 121 is arranged around a degassing channel 104 and the second module contact region 122 is designed in a flat manner without a cutout. As an alternative, the first module contact region 121 can likewise be designed in a continuous manner. The routing of the first conductor tracks 111 and the second conductor tracks 112 is furthermore illustrated only by way of example in FIG. 3; it can differ from the illustration. Two second module contact regions 122 are illustrated in FIG. 3. As an alternative, in a manner corresponding to the first module contact region 121, there is only one second module contact region 122 into which all of the second conductor tracks 112 open. The battery module cover 117 therefore comprises two module contact regions 121, 122. Furthermore, as an alternative, the battery module cover 117 comprises a plurality of first module contact regions 121 and/or a plurality of second module contact regions 122.

The degassing channel 104 opens on an outer side of the battery module cover 117. If the first terminal 1 and the second terminal 2 of a battery cell 10 are screwed into the battery module cover 117, the degassing valve 4 of the battery cell 10 borders the degassing channel 104, so that, in the event of danger, gas can flow out of the battery cell 10, via the degassing valve 4, into the degassing channel 104. By way of example, the first conductor tracks 111 run adjacent to the degassing channel 104. As an alternative, the degassing channel 104 is formed, for example, by the first conductor tracks 111.

Figure 4:
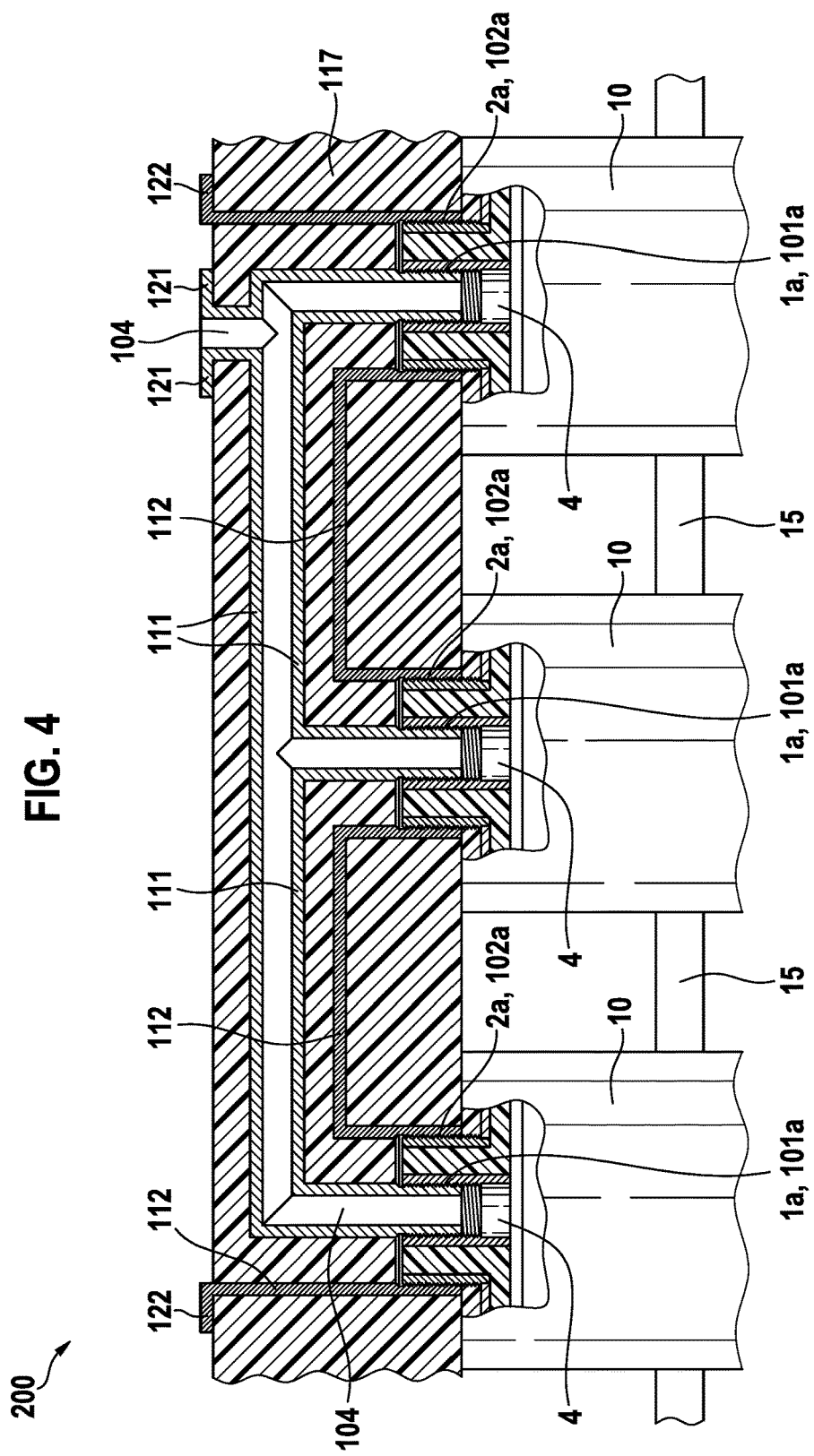

FIG. 4 illustrates a detail of a battery module 200 according to the invention with a battery module cover 117 in accordance with FIG. 3 and battery cells 10 in accordance with FIGS. 1, 2 and 3. The battery cells 10 are located in a state in which they are screwed into the battery module cover 117. For the sake of clarity, not all of the components of the battery cell 10 and the battery module cover 117 are illustrated in FIG. 4. The battery cells 10 are fixed to one another by a fixing arrangement 15 which is arranged transverse to the longitudinal axis of the battery cells 10. The fixing arrangement 15 is formed, for example, by a plate with, for example, circular recesses of cell size into which the battery cells 10 are inserted transverse to the longitudinal axis, so that they are fixedly connected to one another. Furthermore, the battery module cover 117 can comprise an electronics system, not illustrated in the figures, which serves to monitor the cell.

The invention claimed is:

1. A battery cell (10) having a first terminal (1) which is electrically conductively connected to a first electrode and a second terminal (2) which is electrically conductively connected to a second electrode, wherein the first terminal (1) is arranged within the second terminal (2), wherein the first terminal (1) comprises a first screw thread (1a) and the second terminal (2) comprises a second screw thread (2a), wherein the second screw thread is positioned around the first screw thread.

2. The battery cell (10) as claimed in claim 1, characterized in that the screw thread (1a) of the first terminal (1) is an internal thread and the screw thread (2a) of the second terminal (2) is an external thread.

3. The battery cell (10) as claimed in claim 1, characterized in that a rotation direction and a pitch of the screw thread (1a) of the first terminal (1) and of the screw thread (2a) of the second terminal (2) correspond.

4. The battery cell (10) as claimed in claim 1, characterized in that a thread starting point of the screw thread (1a) of the first terminal (1) and of the screw thread (2a) of the second terminal (2) correspond.

5. The battery cell (10) as claimed in claim 1, characterized in that one of the first terminal (1) and the second terminal (2) comprises aluminum.

6. The battery cell (10) as claimed in claim 1, characterized in that the first terminal (1) and the second terminal (2) are electrically insulated from one another, at least in a region between the screw threads (1a, 2a) of said terminals, by an air gap and/or by an insulator (6).

7. The battery cell (10) as claimed in claim 6, characterized in that the insulator (6) comprises a plastic.

8. The battery cell (10) as claimed in claim 6, characterized in that the insulator (6) comprises a polyolefin.

9. The battery cell (10) as claimed in claim 6, characterized in that the insulator (6) comprises a polyethylene or a polypropylene.

10. The battery cell (10) as claimed in claim 1, characterized in that a degassing valve (4) is arranged within the first terminal (1) and/or the second terminal (2).

11. A battery module (200) having at least two battery cells (10) as claimed in claim 1 and a battery module cover (117) which comprises, for each battery cell (10), at least two module cover screw threads (101a, 102a) for screwing in the battery cells (10), wherein the at least two module cover screw threads include a first cover screw thread threadably engaged with the first screw thread of the first terminal and a second cover screw thread threadably engaged with the second screw thread of the second terminal.

12. The battery module (200) as claimed in claim 11, characterized in that the battery module cover (117) comprises conductor tracks (111, 112) which are sheathed using a plastic.

13. The battery module (200) as claimed in claim 11, characterized in that the battery cells (10) are fixed to one another by a fixing arrangement (15) which is arranged transverse to a longitudinal axis of the battery cells (10).

14. The battery module (200) as claimed in claim 11, characterized in that the battery module cover (117) comprises a degassing channel (104) and/or an electronics system for cell monitoring.

15. A method for producing a battery module (200) as claimed in claim 11, characterized in that the first terminal (1) and the second terminal (2) are screwed into in each case one module cover screw thread (101a, 102a) of the battery module cover (117) in synchronism with one another, wherein the at least two module cover screw threads include a first cover screw thread threadably engaged with the first screw thread of the first terminal and a second cover screw thread threadably engaged with the second screw thread of the second terminal.

16. The battery module (200) as claimed in claim 11, characterized in that the battery cells (10) are round battery cells, and in that the battery cells (10) are fixed to one another by a fixing arrangement (15) which is arranged transverse to a longitudinal axis of the battery cells (10).

17. A battery comprising a battery module (200) as claimed in claim 11.

18. A battery comprising a battery cell (10) as claimed in claim 1.

19. A vehicle comprising a battery as claimed in claim 18, wherein the vehicle is an electric vehicle, a hybrid vehicle or a plug-in hybrid vehicle.

20. The battery cell (10) as claimed in claim 1, wherein a thread length of the screw thread (1a) of the first terminal (1) and of the screw thread (2a) of the second terminal (2) correspond.

* * * * *